Figure 1:
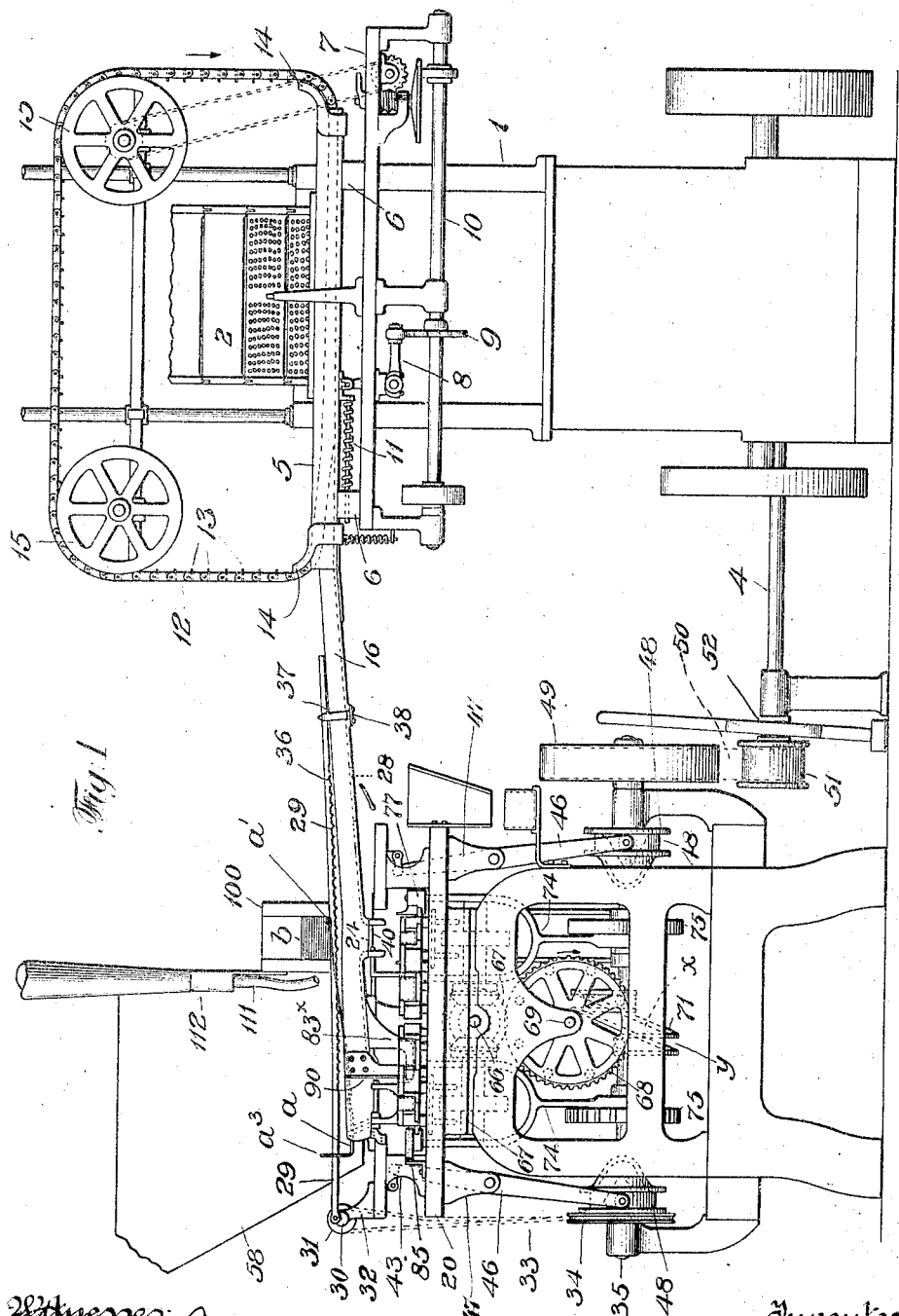

C. H. PALMER & M. PARIDON.
MACHINE FOR PACKING MATCHES.
APPLICATION FILED MAR. 24, 1909.

1,016,436.

Patented Feb. 6, 1912.

13 SHEETS—SHEET 1.

Witnesses:
Paul W. Davis
M. S. Hayes

Inventors.
Charles H. Palmer
Michael Paridon
By John R. Nolan, atty

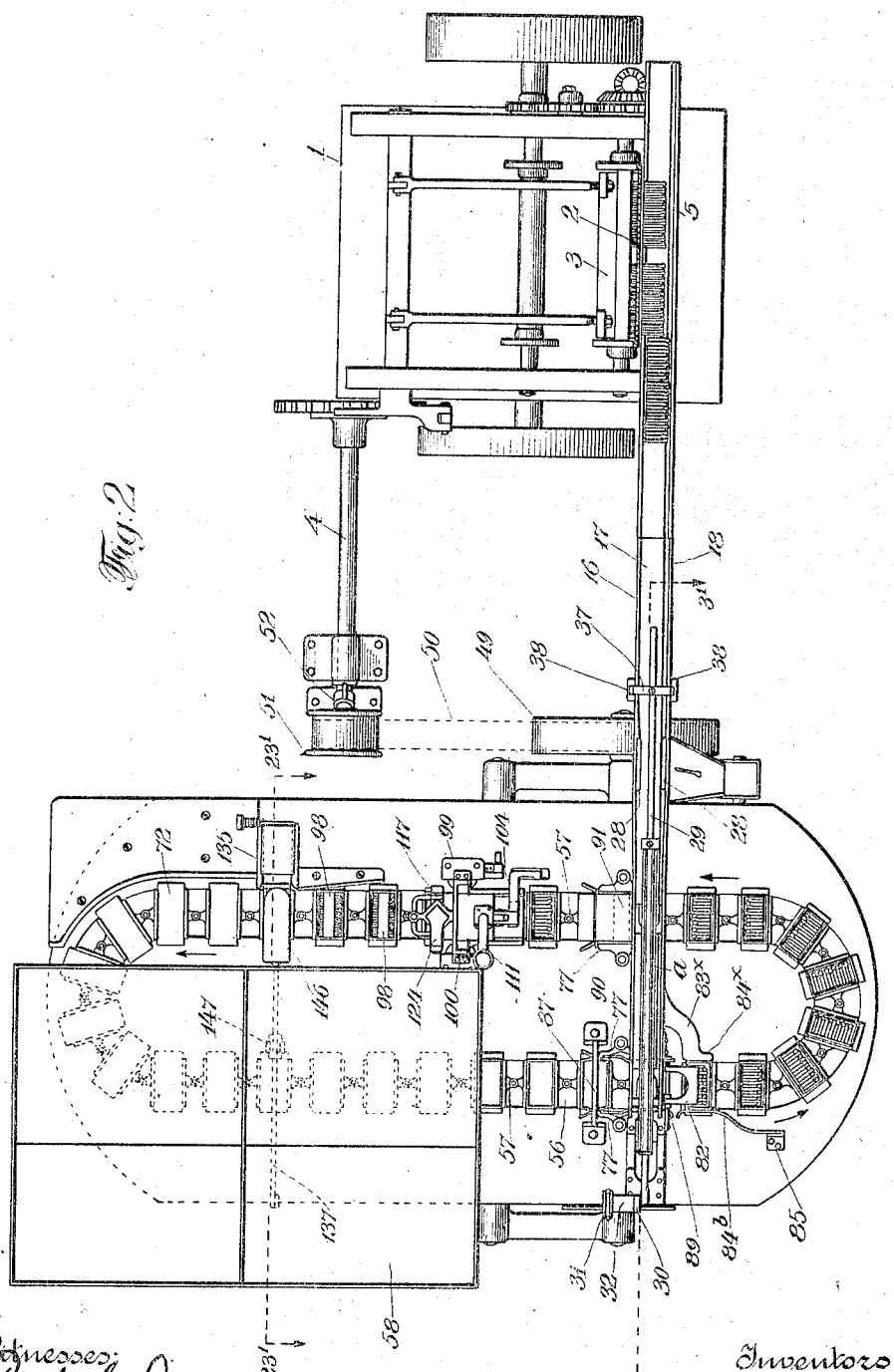

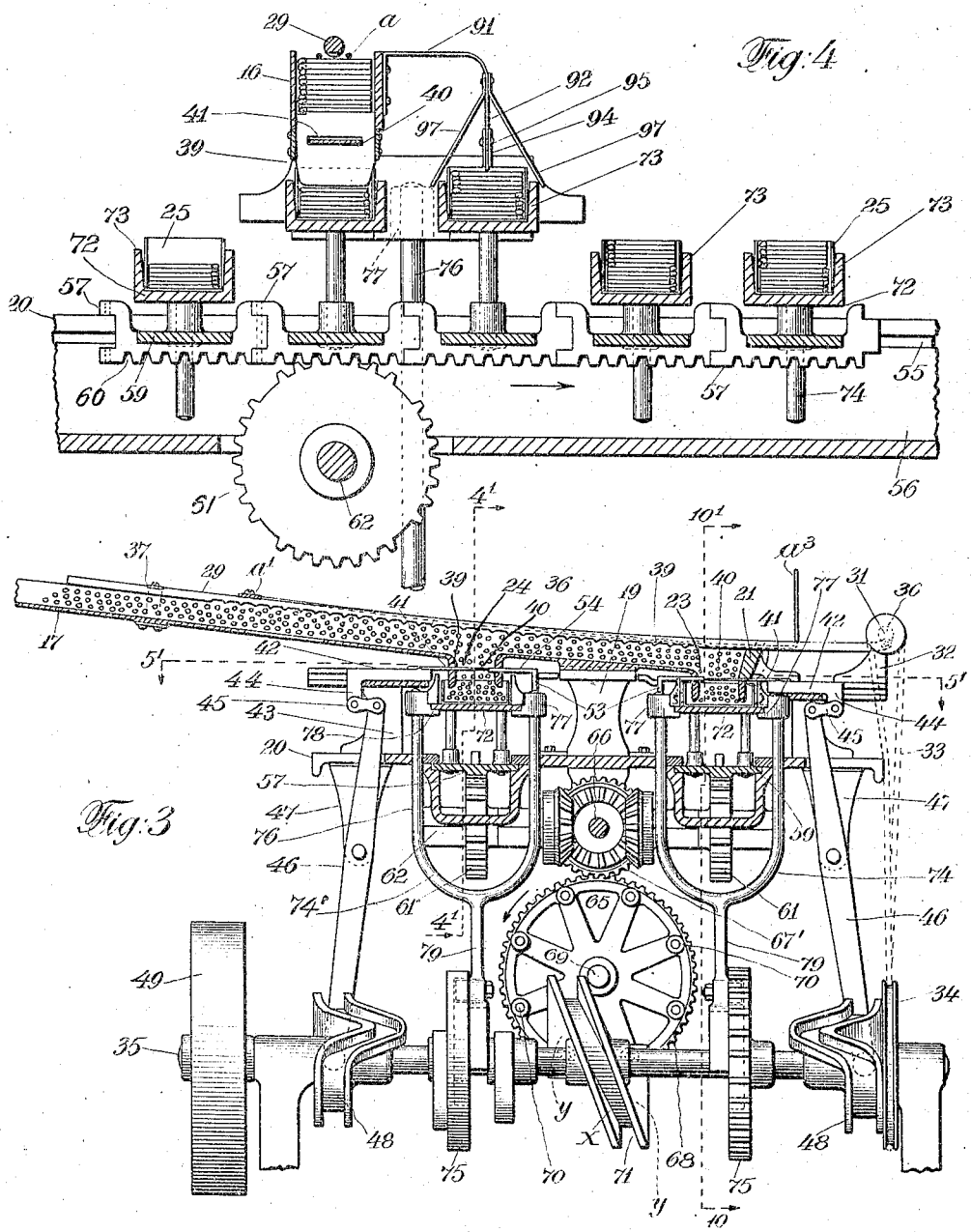

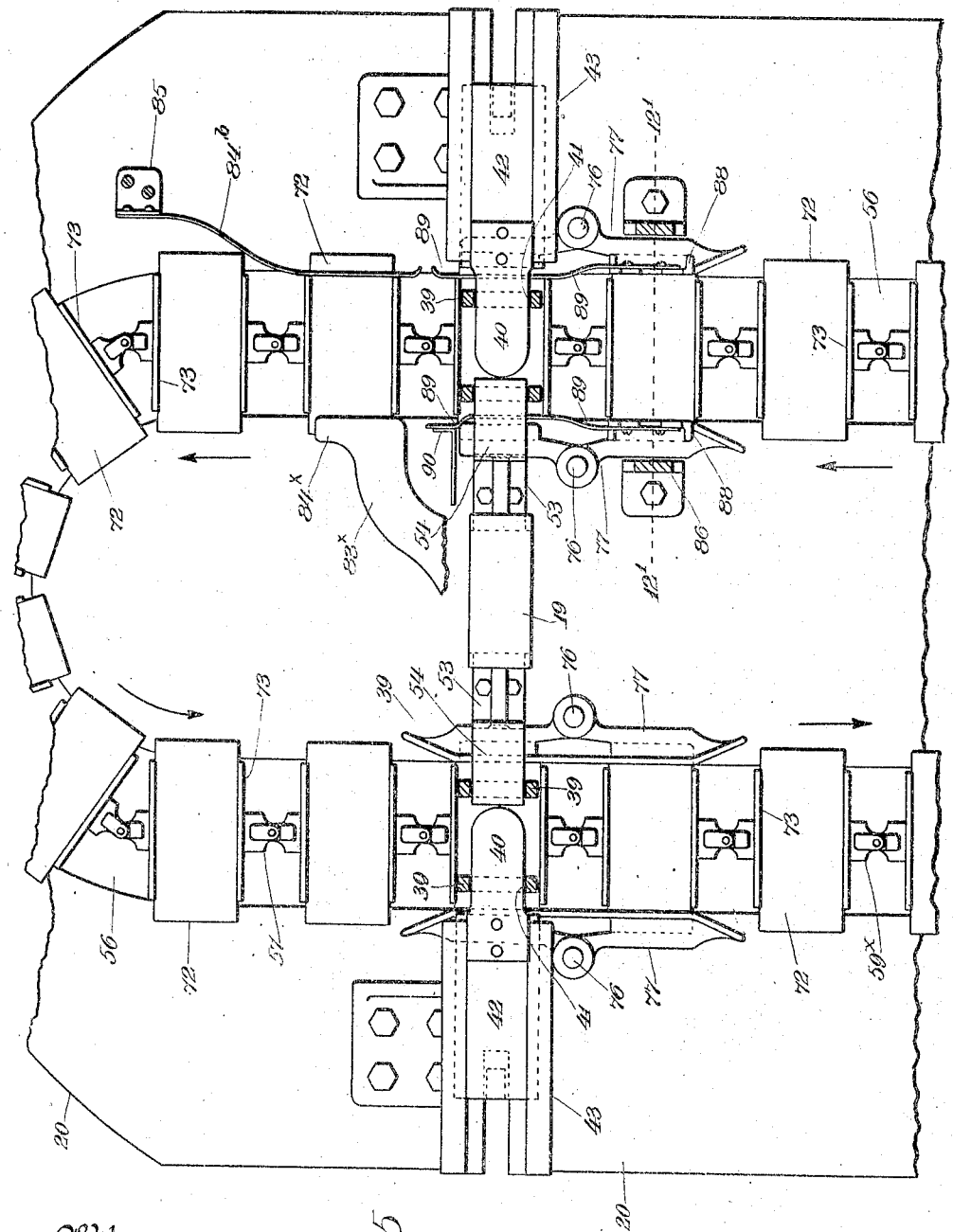

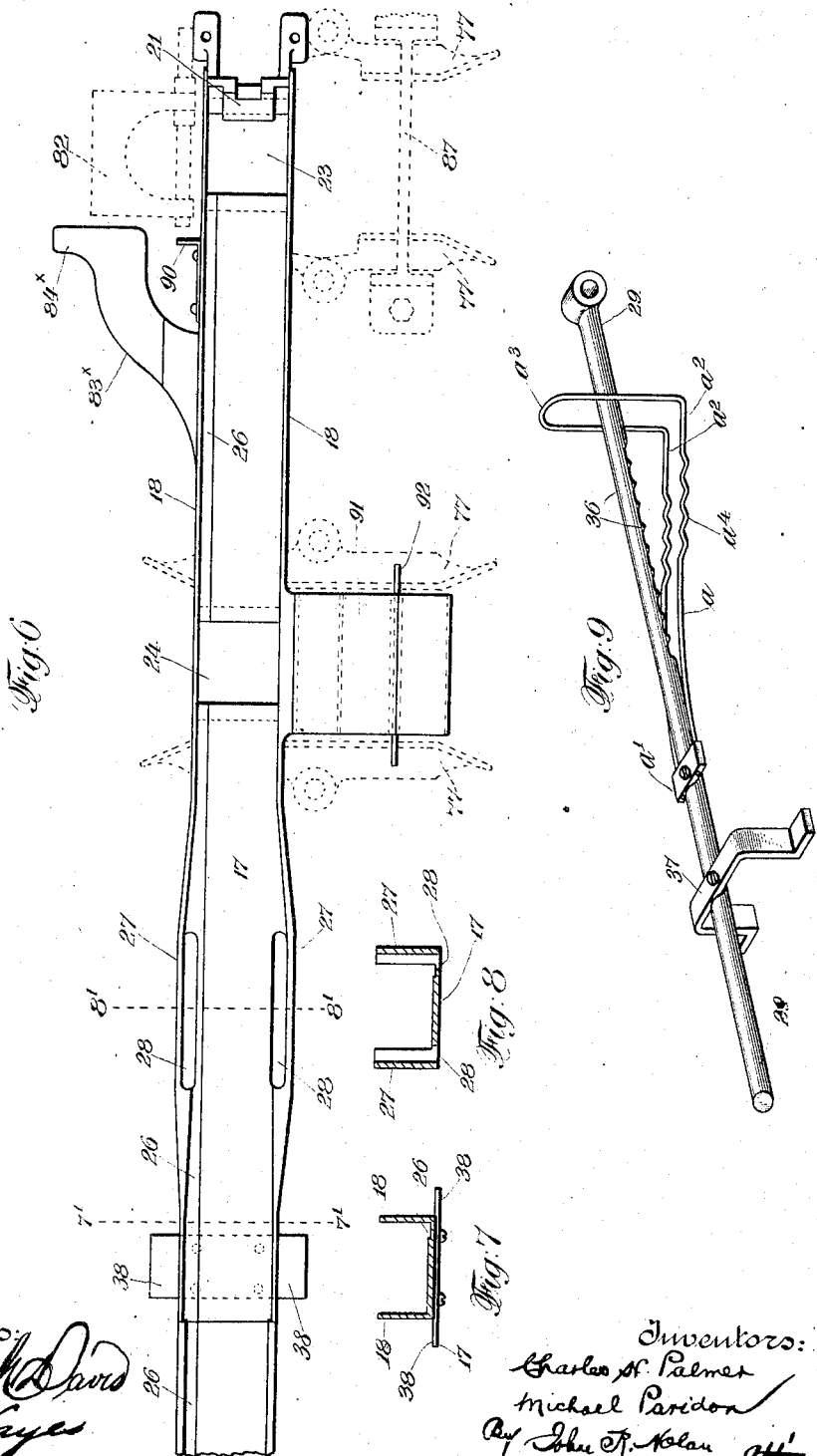

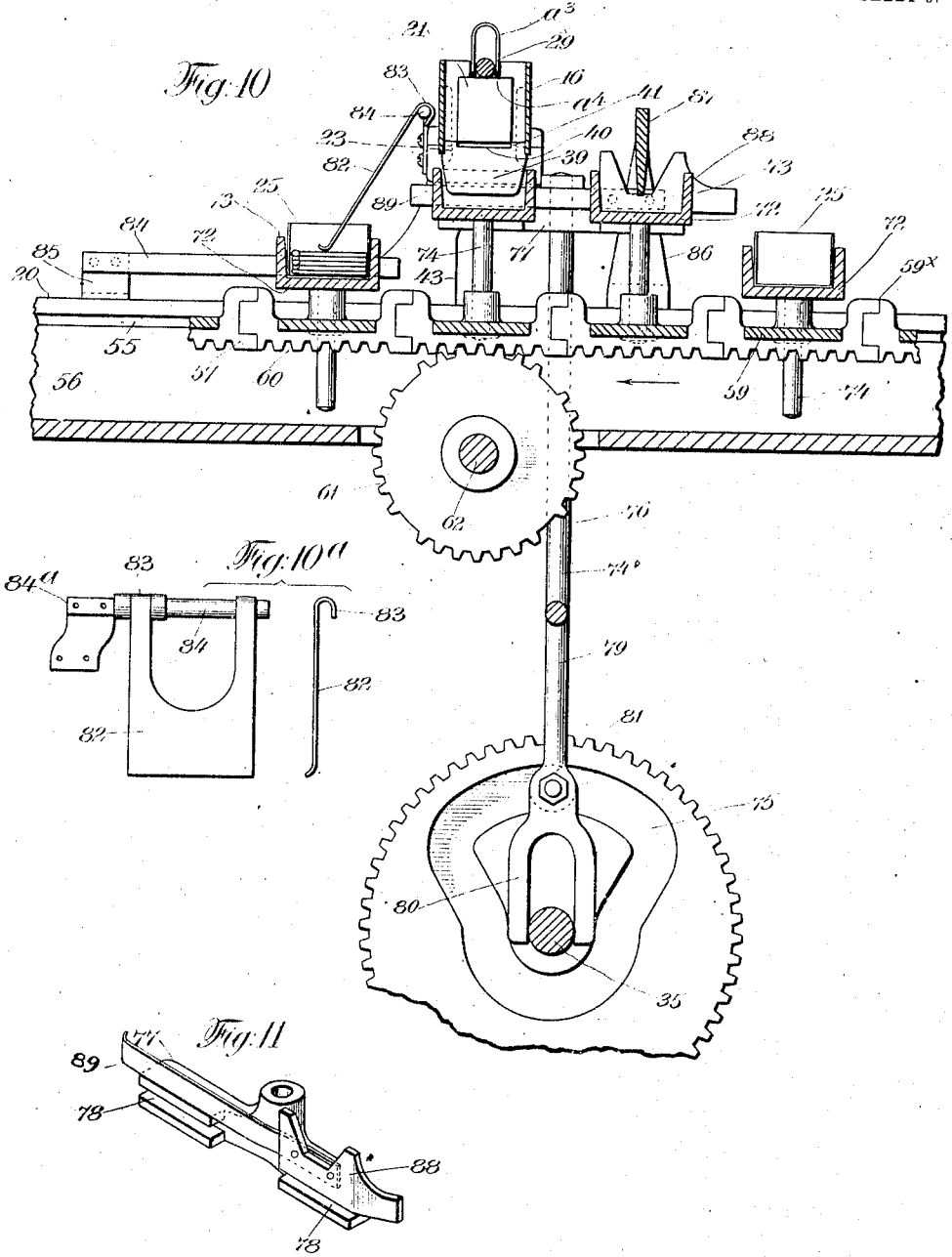

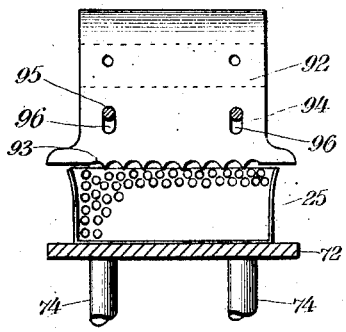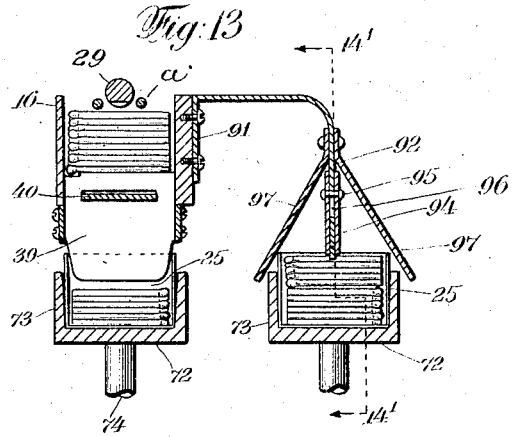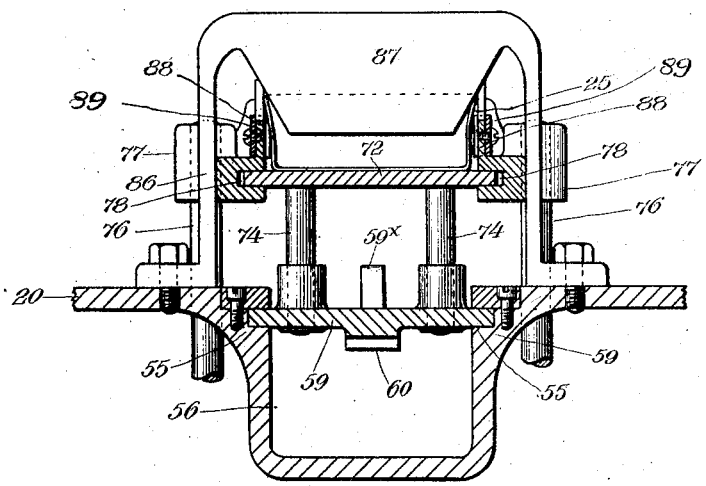

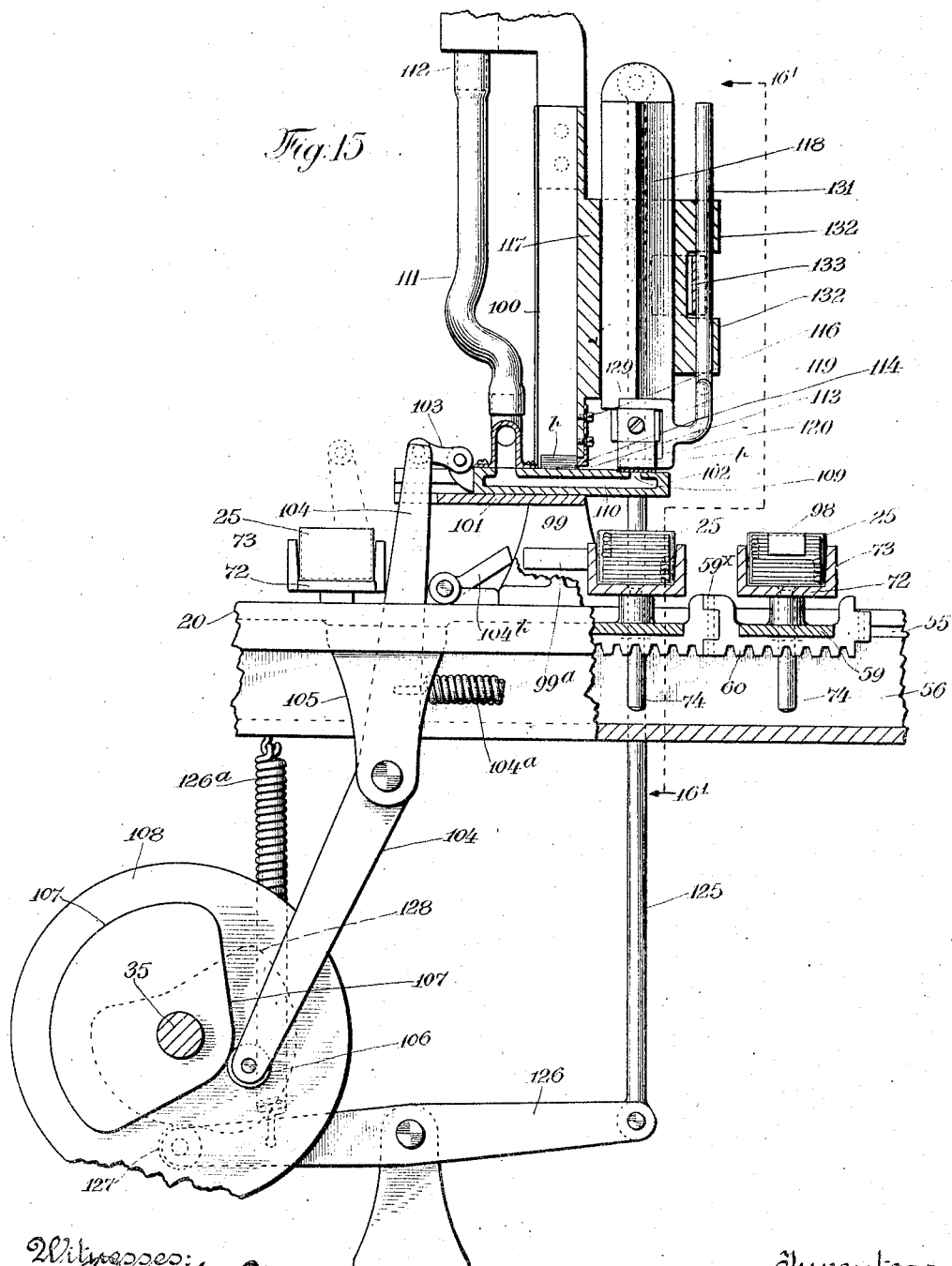

C. H. PALMER & M. PARIDON.
MACHINE FOR PACKING MATCHES.
APPLICATION FILED MAR. 24, 1909.
1,016,436.
Patented Feb. 6, 1912.
13 SHEETS—SHEET 9.
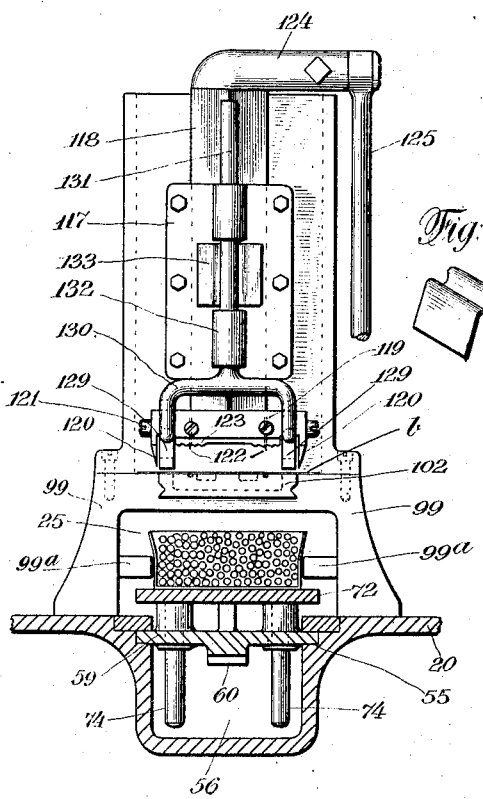
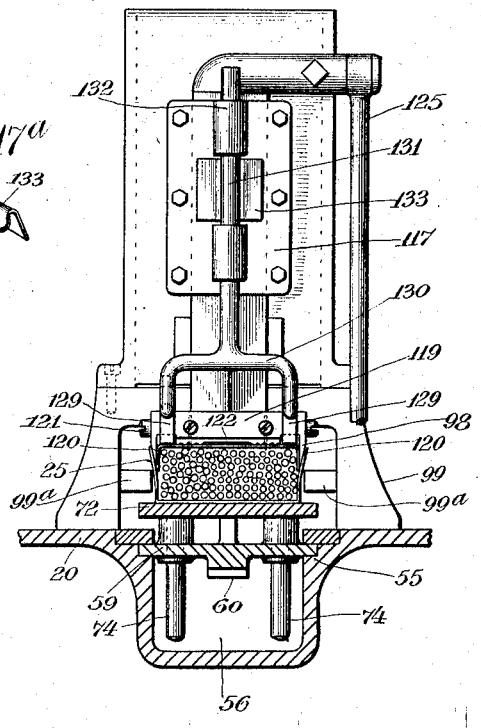

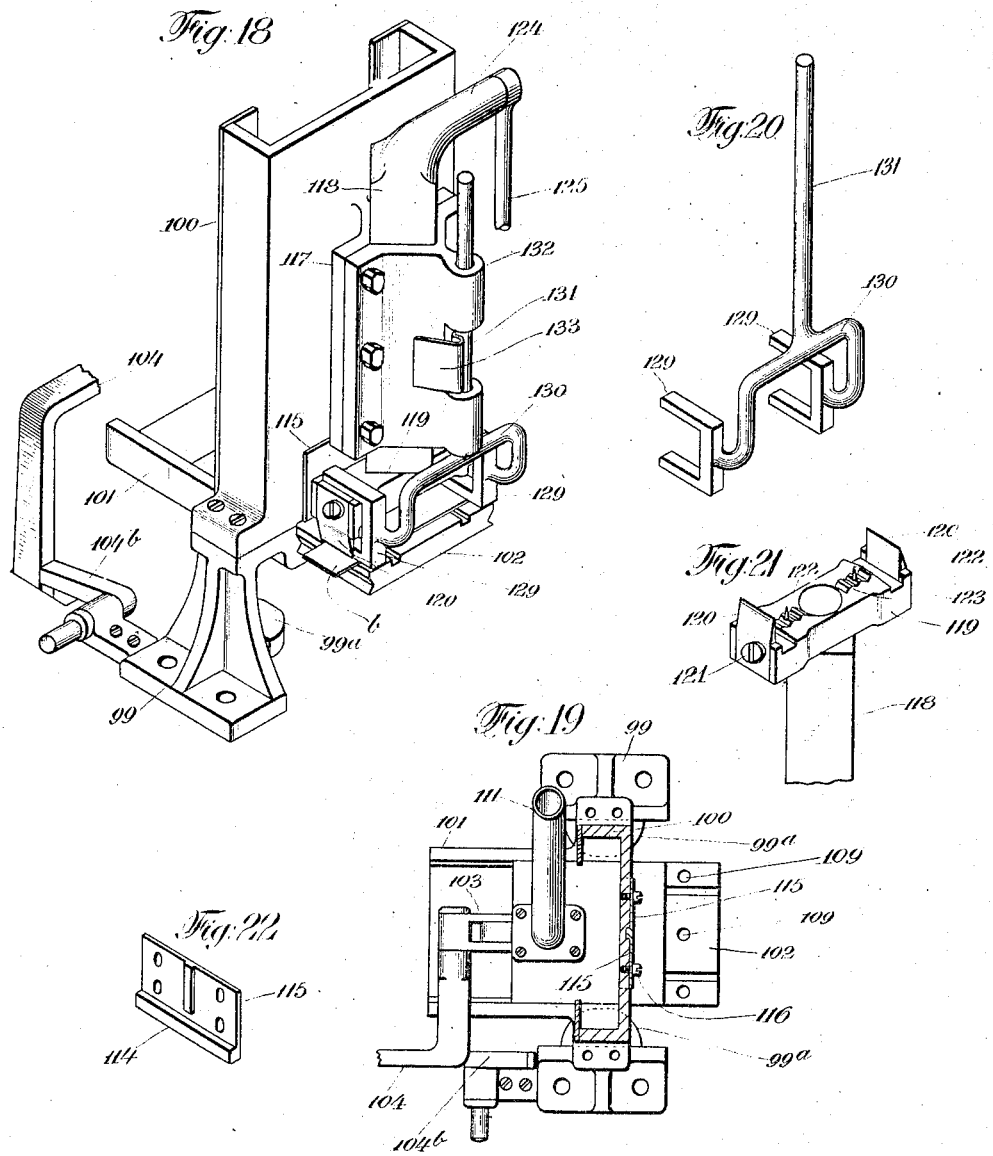

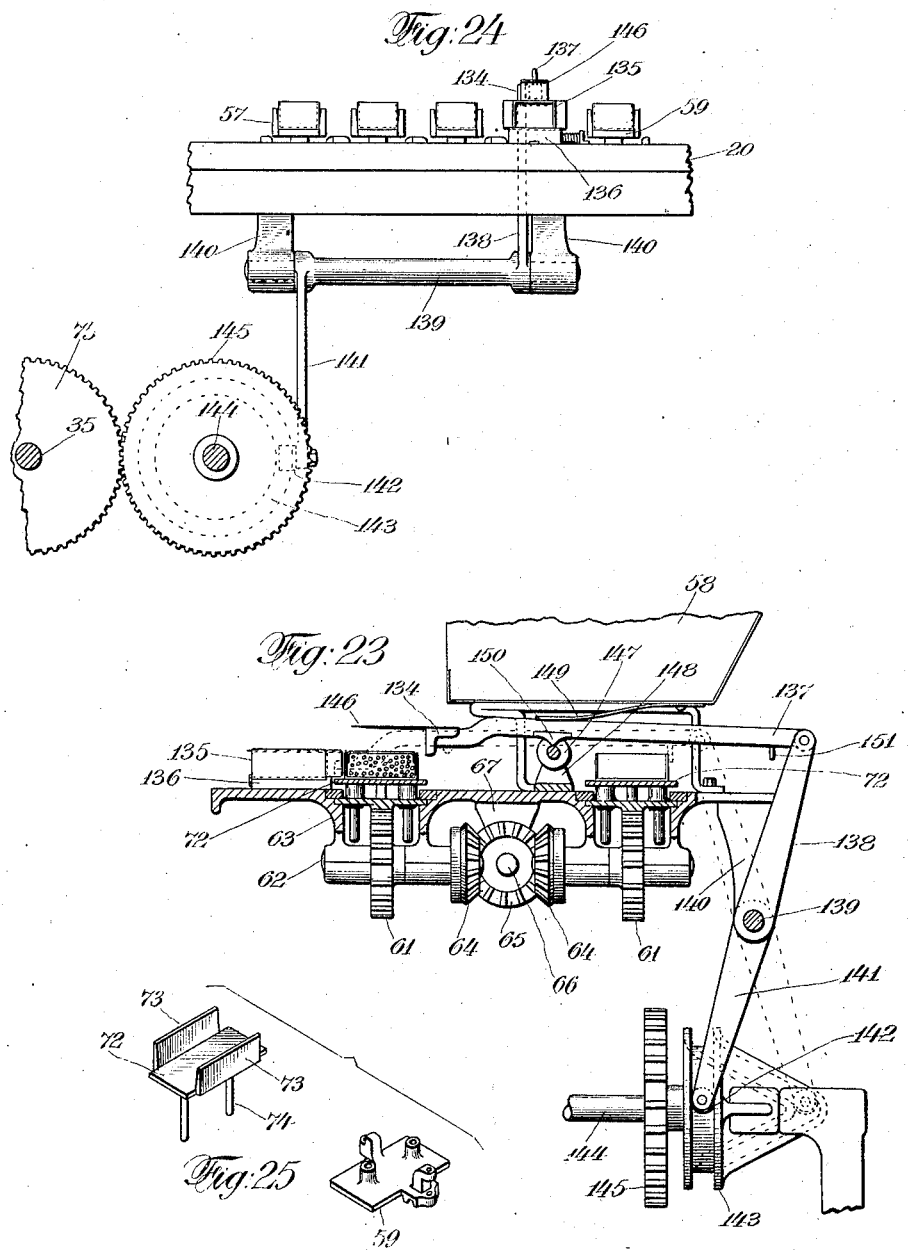

C. H. PALMER & M. PARIDON.
MACHINE FOR PACKING MATCHES.
APPLICATION FILED MAR. 24, 1909.

1,016,436.

Patented Feb. 6, 1912.
13 SHEETS—SHEET 12.

C. H. PALMER & M. PARIDON.
MACHINE FOR PACKING MATCHES.
APPLICATION FILED MAR. 24, 1909.

1,016,436.

Patented Feb. 6, 1912.

13 SHEETS—SHEET 13.

Witnesses:
Paul M. David
M. G. Hayes

Inventors:
Charles H. Palmer
Michael Paridon
By John F. Nolan, Atty

UNITED STATES PATENT OFFICE.

CHARLES H. PALMER, OF AKRON, AND MICHAEL PARIDON, OF BARBERTON, OHIO, ASSIGNORS TO THE DIAMOND MATCH COMPANY, OF CHICAGO, ILLINOIS, A CORPORATION OF ILLINOIS.

MACHINE FOR PACKING MATCHES.

1,016,436.     Specification of Letters Patent.     Patented Feb. 6, 1912.

Application filed March 24, 1909. Serial No. 485,469.

*To all whom it may concern:*

Be it known that we, CHARLES H. PALMER and MICHAEL PARIDON, citizens of the United States, and residents, respectively, of Akron and Barberton, in the county of Summit and State of Ohio, have invented certain new and useful Improvements in Machines for Packing Matches, of which the following is a specification.

This invention relates to machines for packing matches in boxes; having reference particularly, though not exclusively, to packing or filling machines which are associated with match making apparatus and are adapted to receive the matches as rapidly as they are produced, and deliver them in an orderly manner to the box trays or other receptacles.

Briefly stated, the primary object of our invention is to provide simple and efficient means whereby matches shall be expeditiously supplied to, and arranged compactly and parallelly within, the box trays.

Another object is to provide means whereby "protection strips" shall be accurately formed and applied to the filled trays, and still another object is to provide means whereby the said trays shall be automatically inserted into their shucks or covers.

Other objects of the invention will hereinafter appear.

In that form of embodiment of the invention which we have herein illustrated, we employ a reciprocative trough-like hopper arranged adjacent to, and extended laterally from, the discharging end of the match machine, the extension being provided at different points in its length with bottom openings to which each of the trays is presented in succession by a conveyer; measuring chambers in communication with each of the openings; means by which the said chambers are caused temporarily to depend into, and be inclosed by, the subjacent trays, whereby prescribed quantities of matches are successively supplied to each of the trays with the heads of the matches of one quantity lying in one direction and the heads of the matches of the other quantity lying in the opposite direction within the tray; devices whereby the contained matches are shaken down in their trays and distributed uniformly and parallelly therein; a magazine for supplying blank protection strips, and feed and plunger mechanism whereby the blanks are successively moved from the magazine, converted into protection strips, and accurately applied to the filled trays; and a blade and plunger device whereby the filled trays, provided with protection strips, are successively discharged from the conveyer and inserted into a shuck or cover supported in line therewith.

The invention also comprises various novel features of construction and organization, parts and combinations of parts, all of which will be hereinafter fully described and claimed, it being understood that our invention is not limited to the particular form or forms of mechanism illustrated, as in the light thereof the same may be widely varied without departing from the fair spirit of the invention.

Figure 26:
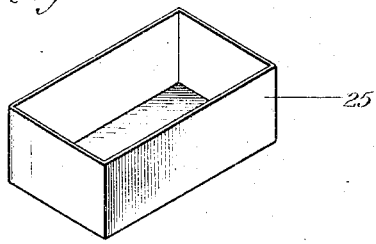
Figure 28:
Figure 27:
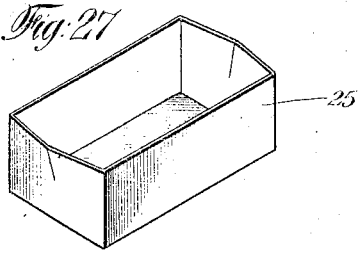
Figure 29:
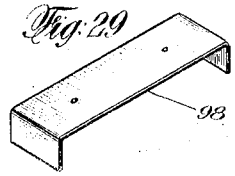
Figure 30:
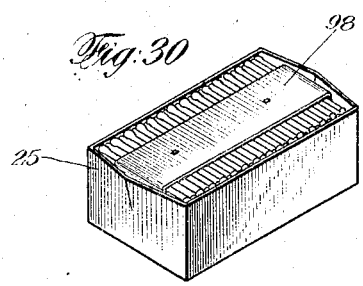
Figure 31:
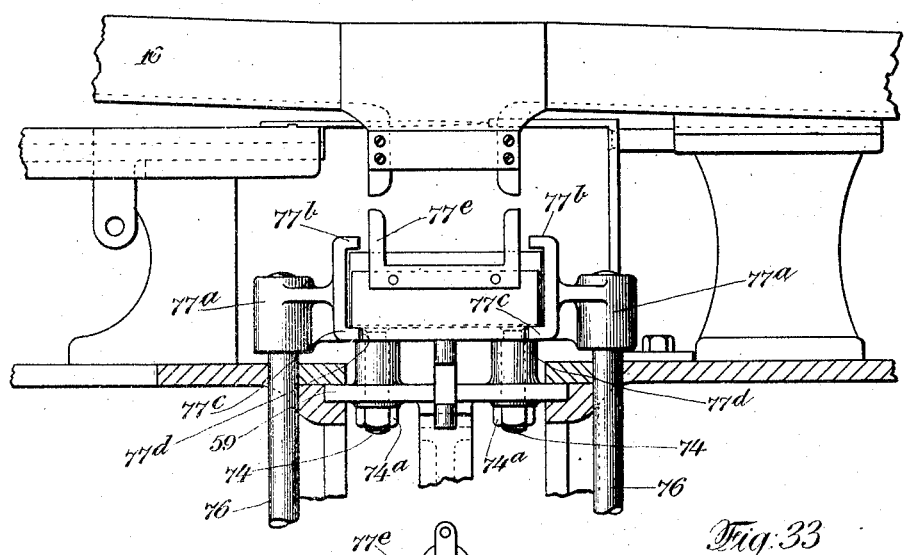
Figure 33:
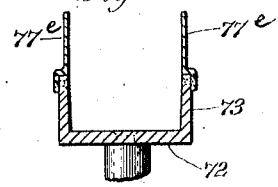
Figure 32:
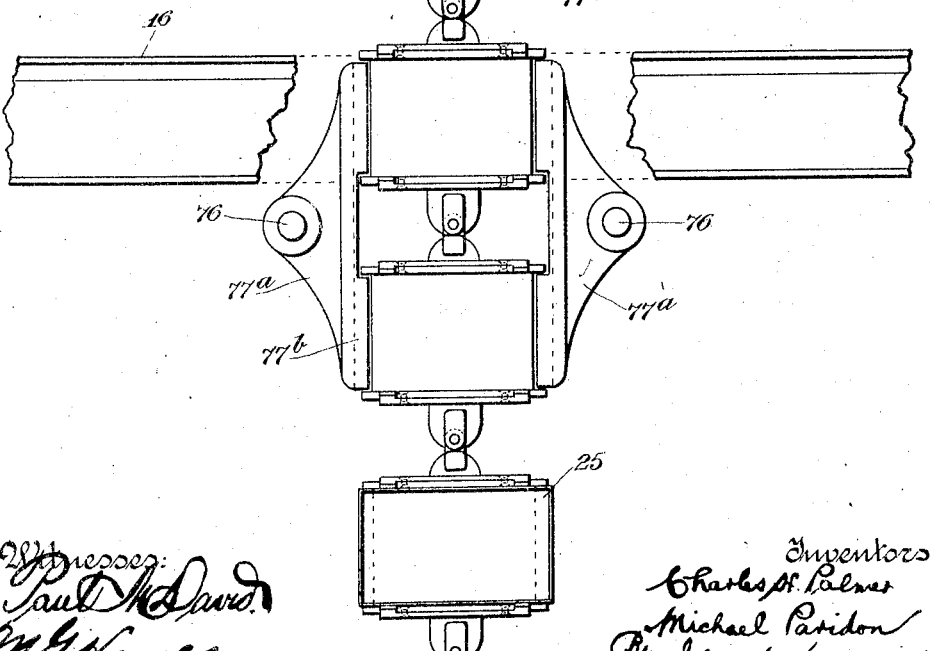

In the drawings—Figure 1 is a front elevation of a packing or filling machine embodying our invention in a preferred form, only so much of the match making machine being shown as is necessary to illustrate the invention. Fig. 2 is a plan of Fig. 1, the devices for feeding the matches along the horizontal trough of the match making machine being omitted. Fig. 3 is a longitudinal vertical section through the inclined trough or hopper extension, and the underlying mechanism, as on the line 3'—3' of Fig. 2. Fig. 4 is a partial transverse vertical section through the extension, and adjuncts, as on the line 4'—4' of Fig. 3. Fig. 5 is a partial horizontal section, as on the line 5'—5' of Fig. 3, immediately above the slides or gates of the measuring chambers, showing said slides or gates, a portion of the tray conveyer and other parts in plan. Fig. 6 is a plan, enlarged, of the inclined trough or hopper extension, and adjuncts, showing, in dotted outline, the raising and lowering devices for the tray holders, and also other parts. Figs. 7 and 8 are cross sections of the said extension, as on the lines 7'—7' and 8'—8', respectively, of Fig. 6. Fig. 9 is a perspective view of the match racking bar and the spring pressure member thereon. Fig. 10 is a partial transverse vertical section through the extension and adjuncts, as on the line 10'—10' of Fig. 3, the box-trays being omitted from the elevated tray holders. Fig. 10<sup>a</sup> is a detail, in front and edge elevation, of an oscillating blade device for straightening and settling the matches within the trays immediately upon their passage beyond the first measuring chamber. Fig. 11 is a detail, in perspective, of one of the tray-raising brackets in advance of said measuring chamber. Fig. 12 is a partial transverse section through the bed, adjacent to the expanding device, as on the line 12'—12' of Fig. 5, showing one of the links of the tray conveyer with its tray-holder elevated by the yoke frame, and the tray in engagement with the expanding device. Fig. 13 is a sectional detail of the extension, adjacent the second measuring chamber, showing, in elevation, the final straightening and settling devices and, in section, two filled trays and their holders in raised position. Fig. 14 is a vertical section, as on the line 14'—14' of Fig. 13. Fig. 15 is a vertical section, partly in elevation, of the devices for forming and applying "protection strips" to the filled box trays, showing a portion of the tray-conveyer with filled trays therein, one as supplied, and another as about to be supplied, with a protection strip. Fig. 16 is a transverse vertical section, as on the line 16'—16' of Fig. 15. Fig. 17 is a similar section showing the strip-forming and inserting plunger and the strip presser in down position, with the strip applied to the filled tray. Fig. 17ᵃ is a detail of friction spring for the strip presser. Fig. 18 is a perspective view of the said plunger, presser, and adjuncts, as removed from the machine. Fig. 19 is a horizontal section of Fig. 18 on a plane above the strip former, the plunger and presser being omitted. Fig. 20 is a perspective view of the strip presser, detached. Fig. 21 is a detail of the functional end of the strip forming and inserting plunger, as inverted. Fig. 22 is a detail of an adjustable throat-piece for the strip containing magazine. Fig. 23 is a partial transverse vertical section, as on the line 23'—23' of Fig. 2, showing, among other things, the devices for ejecting the filled trays successively from the conveyer and inserting them into shucks, the parts being indicated by dotted lines in the position which they occupy when a tray has been pushed into its shuck. Fig. 24 is a partial side elevation of Fig. 23 showing the cam and lever connections for the ejecting and inserting devices. Fig. 25 illustrates, in perspective, a link of the tray conveyer and its tray holder, as separated. Fig. 26 is a perspective view of an ordinary match tray. Fig. 27 is a similar view of the same, after its ends have been spread by the expanding device to facilitate the application of a protection strip thereto. Fig. 28 is a view of a blank for a protection strip. Fig. 29 is a view of the strip as formed. Fig. 30 is a view of a filled box tray with a protection strip applied thereto. Fig. 31 is a sectional elevation of a form of the tray conveyer and the tray elevating frame, wherein the latter directly engages and acts upon the tray to raise and lower the same, the adjacent portion of the inclined trough or hopper extension being illustrated. Fig. 32 is a partial plan of the conveyer and elevating frame shown in Fig. 31, a part of the inclined extension being shown. Fig. 33 is a transverse section through the fixed tray holder, showing its up-standing side guides.

1 is a portion of the main frame of a match making machine, 2 a portion of the endless match carrier, 3 a reciprocating head carrying a row of punches for ejecting the matches row by row from the carrier, and 4 a driven shaft of the machine.

5 is a horizontal trough supported at and transversely of the discharging end of the match machine on a plane below the line of discharge of the matches from the carrier and adapted to receive the stream of falling matches with their heads in one direction. This trough is slidingly supported upon guide blocks 6 rising from a suitable bed 7, and is given a rapid longitudinal reciprocating or jarring motion in order to agitate the contained matches and cause them to settle compactly within the trough. The motion is conveniently secured through a bell crank lever 8, one end of which is pivoted to a depending bracket on the trough and the other end is equipped with a roller which rides upon a peripherally scalloped cam 9 on a driven shaft 10, and is held in operative engagement with said cam by means of a suitably-disposed spring 11.

Passing through and along the upper portion of the trough is the horizontal run of an endless conveyer 12 which is provided with regularly-spaced transverse blades 13, the distance between adjacent blades being less than the length of a match. This conveyer passes around curved guide pieces 14 at the respective ends of the trough, and also around a pair of overlying guide wheels 15, one of which latter is appropriately geared with, and continuously driven from, the shaft 10. The traveling conveyer with its blades progressively enters and passes along the trough, thereby insuring the orderly disposition of the matches transversely of the trough, and conveying them in parallelism to the discharging end of the latter. The mechanism just indicated being of known construction, requires no detailed description herein.

The discharging end of the trough has affixed thereto an inclined extension 16 into which the matches are progressively delivered by the conveyer. This extension preferably comprises an inclined bottom 17, and side walls 18, the bottom being slidingly supported and guided on a post 19 rising from a bed or table 20, and the lower ends of the side walls slidingly embracing a stationary vertically inclined end piece 21 which is affixed to a suitably-located bracket. This piece closes the lower end of the extension, and at the same time, by virtue of the inclined inner face, tends to agitate and press back the matches at such end during the longitudinal reciprocation of the extension. (See Fig. 3.) The bottom is provided at different points in its length with two suitably located openings 23, 24, through which predetermined quantities of matches are discharged to box trays 25, or other suitable receptacles, properly presented to or below such openings. The trough and its extension constitute, in effect, a shallow or elongated trough-like match-feeding hopper of a width to receive and support in substantial parallelism a mass of loosely-contained matches, to which hopper short, rapid longitudinal reciprocations are imparted by the devices above mentioned, during the operation of the match machine. Any other suitable devices for agitating the hopper may be employed.

In order to obviate any liability of ignition of the heads of the matches, by frictional contact with the bottom of the hopper, during their traverse along the latter, we provide such bottom, preferably in both its horizontal and inclined portions, with a longitudinal groove or way 26 adjacent the outer wall of the hopper, which groove or way freely receives the heads of the lowermost row of matches within the hopper.

The sides of the extension, at points in advance of the opening 24, are off-set outwardly, as at 27, and the lateral edges of the bottom of the extension just below the off-sets are provided with slots 28 of sufficient length to permit the free escape of matches that may have slewed lengthwise of the extension. (See Figs. 6, 7, and 8.) Such disarranged matches, during the rapid agitation of the extension, tend to work toward the side walls and thus enter the offset portions of the latter and pass to the bottom slots.

To assist the feed of the matches along the extension, and obviate any liability of their accumulating within and overflowing the extension, we preferably provide a reciprocating bar 29 (Figs. 1, 3 and 9) which overhangs the extension longitudinally thereof, and rests yieldingly upon the contained matches. The bar is pivoted at its lower end to a crank 30, on one end of a short shaft having its bearings in a suitably disposed bracket 32, and provided with a pulley 31 which is connected by means of a belt 33 with a pulley 34 on a driven shaft 35, hereinafter described. To insure the efficient feeding action of the bar on the matches, its lower side is provided at intervals with V-shaped studs or projections 36. The free end of the bar 29 is preferably equipped with a bracket piece 37 which embraces the extension and rests upon laterally-projecting lugs 38 on the latter. Thus the bar is supported in a normal down position along the top of the extension, but has capacity for free upward movement to compensate for the varying heights of the descending stream of matches within the hopper.

The natural tendency of the matches, by reason of their heavier head ends, is to work over to the outer side of the inclined hopper as they are being shaken and racked down, and hence when the hopper is full, or has a surcharge of matches, there is liability of the matches overflowing at the lower portion of the hopper, particularly when the lower end of the racking bar is raised, as illustrated in Fig. 1. To obviate such liability we provide a spring pressure member $a$ which rests yieldingly upon the matches and is reciprocated concurrently with the racking bar. One end of this member is affixed to the bar, as at $a'$, extending thence to and beyond the lower end of the hopper and bearing upon the stationary end piece 21. Preferably this member comprises a piece of spring wire bent or doubled to form two parallel limbs $a^2$ with their free extremities affixed to the racking bar, the lower or curved end of the wire being bent upwardly to form a loop or arch $a^3$ which embraces the bar and is supported and guided thereby. (See Figs. 9 and 10.) The lower portion of the spring member is corrugated, as at $a^4$, to engage the opposing matches in the adjacent part of the hopper, and thus, during the longitudinal movement of the member by the racking bar, tend to press such matches yieldingly upward and prevent an excess accumulation thereof at the lower end of the hopper.

While our invention in its broader aspect contemplates a construction wherein the matches are discharged directly from the hopper openings, 23, 24, to match receptacles progressively presented thereto, yet in the particular form of the invention herein illustrated, the hopper is provided at each of such openings with depending side walls 39 which extend transversely of the hopper and are constructed and arranged to co-act with the underlying box trays to form measuring chambers for the matches supplied to the trays, each of the chambers being provided with a suitable valve or gate, as 40, whereby the supply of matches thereto from the hopper can be controlled. The two valves or gates are or may be practically similar in construction and operation, and, therefore, a description of one will suffice. Each valve or gate, in the preferred form herein illustrated, comprises a plate or blade movable transversely of the measuring chamber in a plane immediately below the hopper opening, the wall of the chamber being provided with an appropriate slot 41 for the reception and guidance of the gate. (See Figs. 3 and 5.) One end of the gate is affixed to a horizontal slide 42 which is mounted in suitable guide ways in a bracket 43 rising from the table 20. Depending from this slide is a lug 44 which is connected by means of a link 45 with the upper arm of a vertical lever 46 which is fulcrumed on a bracket 47 depending from the table. The lower end of this lever is provided with a stud or roller which enters the peripheral cam groove of a cam 48 on the driven shaft 35 above referred to. This shaft is provided with a pulley 49 which is connected by means of a belt 50 with a pulley 51 on the shaft 4 of the match machine. A suitable clutch connection 52 is provided between the pulley and its shaft 4, so that the pulley may be rendered active or idle to permit the stopping or the starting of the shaft 35 at will, during the running of the match machine. The contour of the cam 48 is such that the slide is maintained for a stated interval of time in closing position under the opening, then retracted to opening position, and thereafter immediately returned to closing position.

The two valves or gates are mounted and arranged to operate concurrently, but as their positions in respect to the hopper are reversed,—that is, one on the left hand side of its chamber and the other on the right hand side of its chamber (as viewed in Fig. 3)—the two cams accordingly occupy reverse positions upon the shaft as indicated.

We preferably affix to the table 20 two suitably-located brackets or posts 53 provided with horizontal extensions 54 that freely enter appropriate slots in the inner walls of the measuring chambers, in line horizontally with the sliding gates, and thus afford stationary abutments for the thus afford stationary abutments for the inner ends of the gates. (See Figs. 3 and 5.)

Supported in suitable guide ways 55 formed along the inner walls of an appropriate channel 56 in the table 20 is a horizontally-disposed endless conveyer 57 for the box trays, which conveyer in its travel passes transversely of the hopper and directly under the two measuring chambers in such manner that the trays carried thereby are advanced first beneath the chamber for the opening 23, (such chamber being herein termed the first chamber) to receive therefrom a supply of matches with their heads in one direction, and then carried around and back beneath the other chamber (herein termed the second chamber) to receive therefrom another supply of matches, with their heads in an opposite direction to those of the others. The box-trays are successively supplied by an attendant to the conveyer at a point in advance of the first chamber, a suitable receptacle 58 for a supply of trays being conveniently supported on the table.

The tray-conveyer, in an efficient form thereof, comprises a series of links or plates 59 provided at their lateral edges with perforated lugs 59× by means of which they are hinged together by pins, and provided along their under sides with gear teeth 60 with which mesh appropriate gear wheels 61 for impelling the conveyer, the ends of the plates being slidingly fitted to, and supported by, the guide ways 55 in the channel of the table. In the present instance, two suitably-disposed pairs of gear wheels 61 for impelling the conveyer are employed. The gear wheels of each pair are carried by separate shafts 62 which have their bearings in brackets 63 depending from the table, the inner ends of such shafts being provided with bevel gear wheels 64 in mesh with a bevel wheel 65 on a longitudinally-disposed shaft 66 mounted in bearings in brackets 67 also depending from the table. Thus, when the shaft 66 is driven the shafts 62, through the reverse bevel gearing, are driven in opposite directions to each other in a manner to impel the oppositely traveling parallel portions of the endless conveyer. The shaft 66 is provided with a gear wheel 67′ which meshes with a larger gear wheel 68 on a stud shaft 69, the latter wheel being provided on one face with a series of uniformly spaced studs or rollers 70 which project into the path of an appropriate cam 71 on the driven shaft 35. The contour of this cam, and the position relative thereto of the studs or rollers, are such that during the rotation of the cam it intermittently impels the wheel 68, that is, the cam is provided with a spiral portion $x$ which enters successively between the adjacent studs and impels the wheel a predetermined distance, and plane portions $y$ which at the end of each step or movement of the wheel, succeed the spiral portion between the pins and effectually lock the wheel temporarily at rest. (See Figs. 1 and 3.) Through the gearing described, the intermittent movement of the wheel 68 is transmitted to the tray conveyer, the links or plates whereof are thus successively advanced below the openings of the hopper. It is to be understood, of course, that any other suitable or approved driving mechanism for the tray-conveyer may be employed.

On each of the conveyer plates is supported a holder for a box tray. This holder in a simple form (Fig. 25), comprises a bottom plate 72 having on its upper side two parallel walls 73 spaced to correspond with the width of the tray to be filled and each of a length slightly less than that of the tray. The ends of the bottom plate extend slightly beyond the walls, 73, as indicated. Depending from the plate are pins 74 which are slidingly fitted to perforated bosses in the conveyer link 59 so as to provide for vertical movement of the holder independently of the conveyer.

During each dwell of the conveyer the tray holders directly beneath the openings, 23, 24, of the hopper, are raised and lowered. When these holders are in elevated position, the trays supported thereby receive the depending walls of the proximate measuring chambers, those of the first chamber extending near to the bottom of the tray and those of the other chamber extending partially into its subjacent tray. (See Fig. 3.) The slides 40 are then retracted to permit a quantity of matches to fall from the hopper into each of the measuring chambers, and are then moved inward to cut off the feed. This being done, the holders of the box trays are lowered to clear the bottom of the measuring chambers and permit the contents of the latter to be freely discharged into the trays. The conveyer is impelled in the direction indicated by the arrows in Figs. 2 and 5, so that each of the trays is brought first beneath the chamber in communication with the opening 23 and supplied with a predetermined quantity of matches therefrom, and then carried to and beneath the chamber in communication with the opening 24 and supplied with a quantity of matches therefrom, the walls of the latter chamber extending down to or near to the top of the first charge of matches within the tray. By the construction just described, it will be seen that when the tray reaches the second chamber, such tray has been given a half-turn horizontally, and in consequence, the heads of the second charge of matches when delivered thereto, are disposed oppositely to the heads of the first charge within the tray. (See Fig. 2.)

It is to be noted that the internal distance between the walls of each measuring chamber is less than the length of a match in order to insure the orderly feeding of the matches to the tray. The charge as the tray is lowered, flows within and throughout the length of the tray, the free delivery of the matches to, and their distribution within, the tray being contributed to by the rapid agitation of the measuring chamber, and also preferably by certain tray guiding and agitating devices hereinafter described.

A simple and efficient means for raising and lowering the box-tray holders with respect to the measuring chambers, includes two vertically reciprocating frames 74' under the control of appropriate cams 75 on the driven shaft 35. Each of these frames comprises a vertically-disposed yoke 76 the limbs of which extend above the table and are provided at their upper ends with horizontally disposed brackets 77 having on their inner sides grooves or channels 78 which freely receive the projecting bottom ends of the holder when the latter is brought into position beneath a measuring chamber. Depending from the yoke is a rod 79, the lower end of which is bifurcated as at 80, (Fig. 10) to slidingly embrace the shaft 35 and is provided with a laterally disposed roller 81 which enters the face cam 75 on said shaft. The contour of this cam is such that during its rotation, the yoke frame is vertically reciprocated to effect the timely movement of the tray holder (or holders) engaged therewith; a sufficient dwell being afforded at the limit of each stroke to permit the passage of a holder (with its filled or partially filled tray) from, and that of the succeeding holder (with its empty or partially filled tray) to, the channeled brackets of the yoke frame when the latter is at the bottom of its stroke, and to permit the supply of matches to the measuring chamber and the checking thereof when the said frame is at the top of its stroke.

In order to insure the uniform distribution of the first charge of matches within the box tray, before the passage of the tray to the second measuring chamber, we loosely pivot laterally of the hopper, at a point adjacent to and in rear of the first measuring chamber, the upper end of a plate or blade 82, the lower edge of which swings freely into the interior of the tray when the tray is advanced beyond the latter chamber and drops by gravity upon the matches within the tray. As more clearly seen in Figs. 1, 10 and 10ª, the upper end of the plate is bent to form a hook 83 which is hung on a stud 84 projecting from a piece 84ª which is affixed to one of the guide brackets adjacent the hopper, the lower end of the plate being bent to form a lip which rests freely on the matches within the tray. To effect the bodily jarring of the box tray lengthwise thereof and at right angles to the contained matches when the blade 82 is resting thereon, we affix to the hopper an arm 83ˣ provided with a horizontally grooved head 84ˣ which is arranged to receive the proximate projecting end of the tray holder and thus rapidly tap the same during the agitation of the hopper. A spring strip 84ᵇ conveniently secured to a bracket 85 on the table takes against the opposite projecting end of the holder and its contents. (See Figs. 2 and 5.) Thus it will be seen that as the box trays are carried onward by the conveyer from the first measuring chamber, they are successively subjected to the action of the blade 82 and its associated jarring devices.

We preferably make each pair of grooved or channeled brackets 77 of the vertically reciprocating yoke frames of sufficient length to receive two adjacent box-tray holders so that when one tray is being raised and lowered in respect to its measuring chamber, the adjacent tray is being correspondingly raised and lowered for reasons now to be explained.

Rising from the bed, adjacent to and in advance of the first measuring chamber, is an arch-like bracket frame 86 which bridges the path of the conveyer, said frame having formed or affixed thereto a depending web or plate 87 with beveled or inclined ends as indicated. This plate overhangs the path of the conveyer and is so disposed relatively thereto that as the empty tray is being raised, before its passage beneath the measuring chamber, the inner end walls of the tray, medially thereof, are forced against the inclined ends of the plate, which thereupon effectually expands the opposing ends of the tray and insures the complete opening thereof. (See Figs. 2, 9, 10, 12 and 27.) Such opening of the tray is especially advantageous if and when "protection strips" are to be applied to the filled box trays, as will be hereinafter described.

To brace the ends of the box tray while it is being acted upon by the plate 87, we preferably affix to the brackets of the adjacent lifting frame permanent end pieces 88 between which the tray snugly enters when it passes upon said brackets, these end pieces being vertically recessed or bifurcated to permit the entrance of the plate 87 into the tray and the medial spreading of the ends of the latter. (See Figs 10, 11 and 12.) We conveniently attach to these end pieces two strips 89 of spring metal which extend freely under the hopper and are appropriately spaced to clasp the ends of the tray beneath the measuring chamber. The free end of one of these strips bears against a vertical bracket piece 90 on the outer wall of the hopper, which piece is of sufficient length to be and remain in engagement with the strip at all times. The strips thus not only insure the guidance and maintenance of the tray with relation to the adjacent measuring chamber, but also by reason of the jarring given to the tray by the opposing action of the hopper and the strips, contribute to the settling and distribution of the matches within the tray, as above referred to in connection with the agitation of the measuring chamber. (See Figs. 2 and 5.)

On the side of the hopper adjacent to and in rear of the second measuring chamber, is secured a bracket 91 having at its outer end a depending plate 92 which overhangs the path of the conveyer and partakes of the reciprocations of the hopper. The lower edge of this plate is scalloped or roughened, as indicated at 93. Fig. 14, and is so disposed that when the filled box tray is raised after the tray has passed the second measuring chamber, such edge bears upon the top of the matches and by its reciprocations transversely of the matches serves to distribute and compact them uniformly within the box.

We preferably provide the lower portion of the plate 92 with a pair of vertically movable pieces 94 which normally depend below the scalloped edge of the plate and bear yieldingly upon the matches when the tray is raised and initially lowered, such pieces thus aiding in straightening and settling the matches within the tray. The said pieces embrace the lower edge of the plate, as indicated, and are conveniently united and held in position by rivets 95 or the like, passing loosely through vertical slots 96 in the plate.

Secured to the depending member 92 of the bracket 91, on its respective sides, are the upper ends of a pair of yielding diverging plates 97 between which enters the upper portion of the filled tray when it is raised as just mentioned, such plates thereupon acting against the ends of any matches that may project beyond the sides of the tray and effectually camming or pressing them back into position within the tray. (See Figs. 4, 13 and 14.)

The filled trays are carried by the conveyer to mechanism whereby "protection strips," as 98, are applied to the trays, which mechanism in a simple and efficient form is of the following character, reference being had more especially to Figs. 15 to 22 inclusive. Affixed to the table at a suitable point beyond the second measuring chamber is a bridge bracket 99 which crosses the path of the conveyer, the inner vertical walls of such bracket being preferably provided with beveled or cam projections 99ᵃ between which the tray holders pass. These projections are spaced to engage the projecting end or ends of displaced trays and press them into proper position within the holders. Rising from this bracket is an open vertical magazine 100 for the reception of a pile of strip blanks (b). Upon the bracket is formed or secured a horizontal bed 101 within which is provided a guideway for a slide 102 which affords a bottom for the magazine, and at the same time constitutes a feeder for the strip blanks and a mandrel or former upon which such blanks are bent into proper shape. This slide is reciprocated transversely of the magazine, and parallel to the underlying portion of the tray conveyer. One end of the slide is connected by means of a link 103 with the upper arm of a lever 104 which is fulcrumed to a depending bracket 105 on the table, the lower arm of the lever being provided with a stud or roller 106 which is maintained normally in operative engagement with the cam surface 107 of a cam body 108 on the shaft 35 by means of a spring 104ª secured to the upper arm of the lever and to the table. The contour of this cam surface is such as to effect in conjunction with the opposing action of the spring the timely reciprocation of the slide. When the slide is retracted its forward end lies directly beneath the magazine and receives and supports the lowermost blank of the pile. This end of the slide is recessed on its upper surface transversely thereof, and is provided with a series of perforations 109, which communicate with a chamber 110 formed within the slide, such chamber being conveniently connected by means of a flexible tube 111 with a pipe or trunk 112 leading to a suitable air-exhausting pump, or the like, whereby the air can be exhausted from the chamber to effect the attraction of the blank to and its retention upon the upper perforated end of the slide. When the slide is moved forward its recessed perforated portion, bearing the blank, is projected outwardly beyond the magazine, a suitable throat or opening 113 for the exit of the blank being formed at the bottom of the magazine. In order that the width of this throat or opening may be nicely adjusted to accord with the thickness of the blank, we enlarge the throated portion of the magazine and fit therein a rib or bar 114 formed on a plate 115 which is adjustably secured to the proximate wall of the magazine by set-screws 116 passing through elongated holes in such plate. (See Fig. 15.) The width of the slide 102 is slightly less than the internal length of a box tray and the length of the blank is somewhat greater than that of the tray, so that the ends of the strip project beyond the lateral edges of the slide. (Figs. 16 and 18.) Supported on the wall of the magazine, directly above the projecting end of the slide, is a guide or housing 117 within which is slidingly supported a vertical plunger 118. On the lower end of this plunger is formed or secured a cross-bar 119 having at its ends two depending exteriorly beveled or inclined jaws 120 which are spaced and arranged to embrace the projecting end of the slide when the plunger is depressed. These jaws are preferably separate pieces fitted to recesses in the ends of the cross-bar and secured thereto by screws 121. The lower surface of the bar is provided with short depending needle points, 122, and with short beveled teeth or protuberances 123, for a purpose below explained. (See Fig. 21.) The upper end of the plunger is provided with a laterally-extending arm 124, which is connected by means of a link 125 with one arm of a horizontal lever 126, the other arm of which is provided with a stud or roller 127 which is held in operative engagement with a cam surface 128 of the cam body 108, by means of a spring 126ª secured to the lever and to the table, whereby during the rotation of said cam body the plunger is timely reciprocated.

The coöperative relation of the parts just described is such that when a blank b is projected beneath the plunger the latter descends to cause its jaws to embrace the forward portion of the slide and press down the projecting ends of the blank, the needle points 122 at the same time penetrating the body of the blank. The slide is then retracted, thus leaving the strip between the jaws, the down-turned ends of such strip by their natural tendency to spring outwardly, bearing yieldingly against the inner sides of the jaws. In the continued downward movement of the plunger, the outer beveled sides of its jaws engage the inner sides of the expanded end walls of the tray and effectually enter the depending ends of the strip between such walls and the matches. (See Fig. 17.) By providing the teeth or protuberances 123 on the under surface of the cross bar 119, a uniform engagement of such bar with the body of the strip is insured, and the otherwise liability of irregular impact due to the presence of lint, or the like, on the strip, is avoided. When the plunger is raised the protection strip thus formed and applied, remains within the tray; another filled tray is advanced to the strip-applying mechanism, and the operation above described is repeated.

In order to avoid any liability of the protection strip being withdrawn from the tray during the ascent of the plunger, we provide therefor a retaining device which bears upon the strip during the descent of the plunger and also for an interval of time during the initial ascent of the latter. This device in a simple and efficient form comprises a pair of ⊐-shaped members 129 which horizontally embrace the bar 119 adjacent the respective jaws thereof. These members are connected by a yoke 130, and the latter is provided with a vertical rod 131 which is slidingly fitted to perforated guide lugs 132 on the housing 117 of the plunger; a spring 133, preferably of M-form, being sprung between the housing and plunger. The vertical space between the limbs of each of the members 129 is somewhat wider than the plunger bar, and hence such members have capacity for independent vertical movement relatively to the plunger, the spring by its frictional action upon the rod 131 maintaining said members yieldingly in place. By this construction it will be seen that upon the initial descent of the plunger, the lower limbs of the presser members 129 bear upon the strip on the slide 102, and there remain while the plunger continues its descent; but when the slide recedes the plunger bar impinges against such lower limbs and moves the same forcibly downward therewith and upon the body of the strip. Upon the initial ascent of the plunger and until the jaws are removed from the tray, the presser members remain in engagement with the strip, and hold it down, whereupon the bar engages the upper limbs of such members and bodily raises the presser device into position for a succeeding operation.

As a simple and efficient means whereby the operation of feeding the blanks from the magazine to the plunger can be interrupted if desired, we pivot to a bracket on the table, adjacent to the upper arm of the lever 104, a dog 104$^b$, which may be swung into the path of such arm to maintain it, and perforce the slide, in retracted position against the force of the spring 104$^a$, the lower arm of the lever in that case being beyond the active path of the cam 107. (See Figs. 15, 18 and 19.)

To facilitate the introduction of the filled trays to the chucks, mechanism of the following construction is provided. Beyond the strip-forming and applying mechanism is a horizontally reciprocating plunger head 134 which, during each dwell of the tray conveyer, takes against the opposing end of the filled box tray and pushes it out of its holder and into a box shuck (as 135, Figs. 23 and 24), suitably supported adjacent thereto. In the present instance, the shucks are or may be manually supplied to a suitably-disposed recessed and shouldered block 136 on the table and thereby held in the path of the filled tray. The head 134 is carried by the free end of an arm 137 which extends transversely of the table. This arm is pivoted at its opposite end to an arm 138 rising from a rock shaft 139 which is journaled in brackets 140 on the underside of the table. An arm 141 depending from this shaft is provided with a roller 142 which enters an appropriate cam 143 on a shaft 144. This shaft is parallel to the shaft 35 and is provided with a gear wheel 145 in mesh with a gear wheel on the shaft 35, the latter wheel being conveniently provided by forming one of the cams 75 with peripheral gear teeth. The contour of the cam 143 is such that the timely reciprocation of the arm 137 and its head is effected during each interval of rest of the tray conveyer. (See Figs. 23 and 24.) We preferably provide the head with a thin metallic blade 146 which projects therefrom sufficiently to bear upon the top of the filled tray, throughout the entire length of the latter, when the tray is being pushed from its holder and into the opposing shuck, the blade thus locking the matches within the tray and insuring the insertion of the filled tray into the shuck without disturbance of the contained matches. The arm 137 rests upon, and is guided in its reciprocations by, a grooved roller 147 mounted to rotate in a bracket 148 on the table. A flat spring 149 (Fig. 23) conveniently secured to the under side of the tray receptacle 58 bears upon the arm 137 and presses it yieldingly down upon the roller. On the under side of the arm is a projection 150 which, as it rides upon and off the roller during the reciprocation of the arm, effects the periodical raising and lowering of the arm with its head and blade. The projection is so disposed that it engages the roller and sustains the arm in raised position just before the head abuts against the opposing box tray, thereupon passing from the roller and permitting the arm to drop to a horizontal position and bring its blade firmly down upon the top of the tray. The blade remains upon the tray during its entire insertion, (as indicated by dotted lines in Fig. 23) and is then retracted for a succeeding operation. We preferably provide the arm 137 with a depending stud 151 which is so located in respect to the tray conveyer that when the arm moves forward to eject the filled tray from one run of the conveyer, such stud impinges against the opposing end of an empty tray in the other run of the conveyer and thereby effects and insures the advancement and proper positioning of such empty tray within its holder should the tray be improperly projecting endwise therefrom, it being understood, of course, that the empty trays are supplied to the holders before their passage under the plunger arm.

In Figs. 31, 32 and 33 of the drawings, is illustrated a construction wherein the holders for the box traps are integral with or affixed to the links of the conveyer, and the brackets of the tray elevating and lowering frame are designed directly to engage the ends of the trays and raise and lower them independently of their holders. As shown, each holder is conveniently secured to its conveyer link 59 by nuts 74$^a$ on the stems 74, and the brackets 77$^a$ on the yoke frame are provided at top and bottom with inwardly extending lugs or jaws 77$^b$, 77$^c$, respectively, between which enter the ends of the box tray. The ends of the bottom of the holder are cut away, as at 77$^d$, to permit the free passage between the jaws, of the holder and its contained tray. During the rising and falling of the yoke frame, the tray engaged thereby is periodically raised and lowered in respect to the overlying measuring chamber of the hopper. The walls of the holder are or may be provided with upwardly-extending guide pieces 77$^e$ for the tray.

We claim as our invention—

1. In a machine for packing matches, the combination with means for feeding matches in bulk in substantial parallelism with each other to different points of discharge, and with their heads pointing in the same direction, of means for feeding box trays along one course, and in the same direction, to one point of discharge and then along another course, and in an opposite direction, to the other point of discharge, and for partially turning the trays in a horizontal plane during their change from one course of travel to the other.

2. In a machine for packing matches, the combination with means for feeding matches in bulk in substantial parallelism with each other to different points of discharge, and with their heads pointing in the same direction, of a conveyer for match receptacles mounted to travel in a continuous horizontal path adjacent the respective points of discharge whereby the receptacles are moved along one course, and in the same direction, to one point of discharge, and then partially turned and moved along another course, and in an opposite direction, to the other point of discharge.

3. In a machine for packing matches, a trough-like hopper having bottom openings at different points in its length, and having its mouth or receiving part horizontally in advance of said openings, means for feeding matches along the bottom of said hopper and above the openings thereof, and means whereby box trays are fed to one opening of the hopper, moved laterally beyond the hopper and partially turned, and then returned to the hopper and presented to another opening thereof.

4. In a machine for packing matches, an inclined trough-like hopper having bottom openings at different points in its length, and having its mouth or receiving part horizontally in advance of said openings, means for progressively feeding matches in parallelism along the said hopper and above the openings thereof, and means for feeding box trays progressively in opposite directions transversely of the hopper and beneath the openings thereof, whereby each tray receives the matches first from one opening and then from another opening.

5. In a machine for packing matches, an inclined trough-like hopper having bottom openings at different points in its length, and having its mouth or receiving part horizontally in advance of said openings, means for progressively feeding matches in parallelism along the said hopper and above the openings thereof, and a box-tray conveyer traveling in opposite directions transversely of and below said hopper and beneath the openings thereof, whereby the trays are fed to the openings successively to receive matches first from one opening and then from another opening.

6. In a machine for packing matches, an inclined trough-like hopper, having bottom discharge openings at different points in its length, and having its mouth or receiving part horizontally in advance of the openings, means for bodily jarring the hopper to feed matches in parallelism along the said hopper and above the openings thereof, and means for feeding box trays progressively in opposite directions transversely of and beneath said hopper to receive the matches first from one opening and then from another opening.

7. In a machine for packing matches, a trough-like hopper arranged alongside of the discharge end of a match-machine and into which the matches are discharged directly from the match machine and extending thence away from the match-machine and having discharge openings in the bottom of such extended portion, means for feeding matches along the hopper during the running of the match machine, and means for feeding box trays automatically in opposite directions transversely of and beneath said extension to receive the matches first from one opening and then from another opening.

8. In a machine for packing matches, a hopper arranged alongside of the discharge end of a match machine and into which the matches are discharged directly from the match machine and extending thence away from the match machine and having discharge openings in the bottom of such extended portion, means to maintain said hopper in rapid continuous lengthwise bodily reciprocation during the running of the match machine, and means to feed the trays automatically in opposite directions transversely of the hopper and beneath the openings thereof, whereby each tray receives the matches progressively from such openings.

9. In a machine for packing matches, a hopper arranged adjacent to the match ejecting or discharge mechanism of a match machine, and having an inclined lateral extension away from such match machine provided with bottom openings, means for imparting continuously a rapid longitudinal reciprocation to the said hopper, and automatic mechanism for feeding box trays progressively in opposite directions transversely of and beneath said extension to receive the matches first from one opening and then from another.

10. In a machine for packing matches, a trough or hopper comprising a bottom and side walls, the latter for a portion of their length being outwardly off-set, and the bottom having therein slots communicating with the lateral offsets.

11. In a machine for packing matches, an elongated hopper having an inclined bottom and parallel side walls, the latter for a portion of their length being outwardly offset, and the bottom having therein slots communicating with the lateral offsets, and means for agitating said hopper.

12. In a machine for packing matches, the combination with a trough-like hopper for the reception of a mass of matches, the bottom of said hopper having at different points in its length openings for the discharge of the matches, of a match racking member overhanging the hopper longitudinally thereof, and means for effecting relative longitudinal reciprocating movement between said hopper and racking member.

13. In a machine for packing matches, the combination with a trough-like hopper, of a match racking bar overhanging the hopper longitudinally thereof, said bar being pivoted at one end to have capacity for vertical movement, and means for effecting relative longitudinal reciprocating movement between said hopper and bar.

14. In a machine for packing matches, the combination with a trough-like hopper for the reception of a mass of matches, the bottom of said hopper having at different points in its length openings for the discharge of the matches, of a match racking bar overhanging the hopper longitudinally thereof, the under side of said bar having depending studs or teeth, and means for effecting relative longitudinal reciprocating movement between said hopper and bar.

15. In a machine for packing matches, the combination with a trough-like hopper, of a match racking bar overhanging the hopper longitudinally thereof, a spring member connected with said bar and adapted to bear upon the contents of the hopper at or near the rearward end of the latter, and means for effecting relative longitudinal movement between said hopper and bar.

16. In a machine for packing matches, the combination with a trough-like hopper, of a match racking bar overhanging the same longitudinally thereof, a spring member connected with said bar and having a corrugated portion adapted to bear upon the contents of the hopper at or near the rearward end of the latter, and means for effecting relative longitudinal reciprocating movement between said hopper and bar.

17. In a machine for packing matches, the combination with a trough-like hopper for the reception of a mass of matches, the bottom of said hopper having at different points in its length openings for the discharge of the matches, of a yielding match-agitating member overhanging the rearward portion of the hopper longitudinally thereof, and means for effecting relative longitudinal movement between said member and hopper.

18. In a machine for packing matches, the combination with a trough-like hopper for the reception of a mass of matches, the bottom of said hopper having at different points in its length openings for the discharge of the matches, of a match racking bar overhanging the hopper longitudinally thereof, and means for longitudinally reciprocating said bar.

19. In a machine for packing matches, the combination with a trough-like hopper, of a match racking bar overhanging the hopper longitudinally thereof, a spring member connected with said bar and extending below the same, and means for longitudinally reciprocating said bar and member.

20. In a machine for packing matches an elongated trough-like hopper of a width to receive and support in substantial parallelism a mass of loosely contained matches, said hopper being provided at different points in its length with transverse openings for the discharge of the contained matches, and means whereby receptacles are presented to one opening of the hopper, moved laterally beyond the hopper and partially turned, and then returned to the hopper and presented to another opening thereof.

21. In a machine for packing matches an elongated trough-like hopper of a width to receive and support in substantial parallelism a mass of loosely contained matches, said hopper being provided at different points in its length with transverse openings for the discharge of the contained matches, and means whereby receptacles are presented to one opening in the hopper, moved laterally beyond the hopper and partially turned, and then returned to the hopper and presented to another opening thereof, and means for periodically closing said openings.

22. In a machine for packing matches, an elongated trough-like hopper of a width to receive and support in substantial parallelism a mass of loosely-contained matches, said hopper being provided at different points in its length with transverse openings for the discharge of the contained matches, and means for feeding receptacles progressively in opposite directions transversely of the hopper and beneath the openings thereof.

23. In a machine for packing matches, an elongated trough-like hopper of a width to receive and support in substantial parallelism a mass of loosely-contained matches, said hopper being provided at different points in its length with transverse openings for the discharge of the contained matches, of a conveyer for match receptacles mounted to travel in a continuous horizontal path below the hopper and beneath the respective openings thereof, whereby the receptacles are presented to one opening in the hopper and moved beyond the latter, and then returned beneath the hopper and presented to another opening thereof.

24. In a machine for packing matches, an elongated trough-like hopper of a width to receive and support in substantial parallelism a mass of loosely-contained matches, said hopper being provided at different points in its length with transverse openings for the discharge of the contained matches, a flexible conveyer composed of links having tray-receiving portions, and means for supporting and guiding said conveyer in a continuous horizontal path below the hopper and beneath the respective openings thereof, whereby the tray receiving portions are presented to one opening of the hopper and moved beyond the latter, and then returned beneath the hopper and presented to another opening thereof.

25. In a machine for packing matches, an elongated trough-like hopper of a width to receive and support in substantial parallelism a mass of loosely-contained matches, said hopper being provided with a discharge opening and a depending measuring chamber in communication with said opening, said chamber being internally of less length than that of a match, means for controlling the communication between the opening and chamber, a support for match receptacles, and means for effecting a relative vertical movement between said support and the measuring chamber, whereby the latter is caused to depend temporarily within the subjacent receptacles and be inclosed thereby.

26. In a machine for packing matches, the combination with an elongated trough-like hopper of a width to receive and support in substantial parallelism a mass of loosely-contained matches, said hopper being provided at different points in its length with transversely-extending discharge openings having depending measuring chambers, and means for periodically controlling the supply of matches to said chambers, of means for progressively feeding match receptacles beneath the chambers, and means for effecting relative vertical movement between the chambers and the underlying receptacles, whereby the chambers are caused to depend temporarily within the said receptacles and be inclosed thereby.

27. In a machine for packing matches, an elongated trough-like hopper of a width to receive and support in substantial parallelism a mass of loosely-contained matches, said hopper being provided at different points in its length with transversely-extending discharge openings having depending measuring chambers, means to control communication between said openings and chambers, means to advance match receptacles under the chambers, and means to effect a relative vertical movement between the chambers and the subjacent receptacles, whereby the chambers are caused periodically to depend within the said receptacles and be inclosed thereby.

28. In a machine for packing matches, the combination with an elongated trough-like hopper of a width to receive and support in substantial parallelism a mass of loosely-contained matches, said hopper being provided at different points in its length with transversely extending discharge openings having depending measuring chambers, and means for periodically controlling the supply of matches to said chambers, of means for progressively feeding receptacles beneath the chambers and for partially turning the receptacles in a horizontal plane during their passage from one chamber to another.

29. In a machine for packing matches, the combination with a plurality of depending measuring chambers, means for feeding matches thereto, and means for periodically controlling the supply of matches to said chambers, of means for progressively feeding receptacles beneath the chambers and for partially turning the receptacles in a horizontal plane during their passage from one chamber to another, and means for effecting a relative vertical movement between the measuring chambers and the subjacent receptacles whereby the chambers are caused to depend temporarily within the said receptacles and be inclosed thereby.

30. In a machine for packing matches, the combination with a hopper provided with a discharge opening, and means for periodically closing said opening, of means for advancing match receptacles under the said opening, means for effecting a relative vertical movement between the chambers and the subjacent openings, and means for jarring the said receptacles when they are under the opening.

31. In a machine for packing matches, the combination with means for feeding match receptacles, of an oscillatory blade depending edgewise into the path of the receptacles, and adapted to swing into and from the interior of the several receptacles during their travel.

32. In a machine for packing matches, the combination with means for feeding match receptacles, of an oscillatory blade depending edgewise into the path of the receptacles and adapted to swing into and from the interior of the several receptacles during their travel, and means for jarring the receptacles when the blade is within the same.

33. In a machine for packing matches, the combination of a match supply hopper having a discharge opening, means for feeding match receptacles in a path under and past said opening, and an oscillatory blade depending edgewise into such path at a point beyond the opening.

34. In a machine for packing matches, the combination of a match supply hopper having a discharge opening, means for feeding match receptacles in a path under and past said opening, an oscillatory blade depending edgewise into such path at a point beyond the opening, and means for jarring the receptacles at such point.

35. In a machine for packing matches, the combination of a match supply hopper having a discharge opening, a conveyer for feeding match receptacles in a path under and past said opening, an oscillatory blade depending into such path at a point beyond the opening, means for jarring the hopper, and means on the hopper for impinging against the conveyer at such point.

36. In a machine for packing matches, the combination of a match supply hopper having a discharge opening, a conveyer for feeding match receptacles in a path under and past said opening, an oscillatory blade depending into such path at a point beyond the hopper, means for jarring the hopper, an arm on the hopper for impinging against one side of the conveyer at such point, and a spring arranged to bear against the opposite side of the conveyer.

37. In a machine for packing matches, the combination with means for feeding match receptacles, of a vertically-disposed plate above the path of the receptacles, means for effecting a relative vertical movement between said receptacles and plate, whereby the receptacles receive the lower edge of the plate, and means for effecting a relative horizontal jarring movement between the receptacles and plate.

38. In a machine for packing matches, the combination with means for feeding match receptacles, of a vertically disposed plate above the path of the receptacles, the lower edge of said plate being toothed or roughened, means for effecting a relative vertical movement between said receptacles and plate whereby the receptacles receive the lower edge of the plate, and means for effecting a relative horizontal jarring movement between the receptacles and plate.

39. In a machine for packing matches, the combination with means for feeding match receptacles, of a vertically-disposed plate above the path of the receptacles, means for effecting a relative vertical movement between said receptacles and plate, whereby the receptacles receive the lower edge of said plate, and means for jarring the plate within the receptacles.

40. In a machine for packing matches, the combination of a match supply hopper having a discharge opening, means for feeding match receptacles in a path under and past said opening, means for jarring the hopper, a vertical plate arranged exteriorly of the hopper to overhang the path of a receptacle when it passes beyond the opening, and means for effecting a relative vertical movement between said receptacle and plate, whereby the lower edge of the latter is caused to bear upon the contents of the receptacle.

41. In a machine for packing matches, the combination with means for feeding match receptacles, and means for supplying matches in parallelism to said receptacles and transversely thereof, of a pair of diverging blades overhanging the path of the receptacles, and means for effecting a relative vertical movement between the receptacles and the blades, whereby the latter are caused to embrace the upper lateral edges of the receptacles successively and cam or press back any matches projecting beyond the sides of the receptacles.

42. In a machine for packing matches, the combination of means for feeding match receptacles, and means for supplying matches in parallelism to said receptacles and transversely thereof, a relatively thin vertically disposed plate overhanging the path of the receptacles and the lower horizontal edge of said plate extending at right angles to the length of the matches within the receptacles, a loosely-supported member adjacent to and parallel with said edge and having capacity for limited vertical movement below said edge, and means for effecting relative vertical movement between the receptacles and the plate.

43. In a machine for packing matches, the combination of means for feeding match receptacles, and means for supplying matches in parallelism to said receptacles and transversely thereof, diverging plates overhanging the receptacles, a vertical plate between said diverging plates, and means for effecting relative vertical movement between said receptacles and the overlying plates, whereby the said diverging plates are caused to embrace the upper lateral edges of the receptacles and cam or press back any matches projecting at their ends beyond the sides of the receptacles, and the said vertical plate is caused to bear upon and transversely of the contained matches.

44. In a machine for packing matches, the combination of a match supply hopper having a discharge opening, means for feeding match receptacles in a path under and past said opening, through which matches are fed in parallelism to subjacent receptacles and transversely thereof, a pair of diverging plates overhanging such path at a point beyond the opening, and means for effecting a relative vertical movement between a receptacle and the plates at such point, whereby the latter are caused to embrace the upper lateral edges of the receptacles and cam or press back any matches projecting beyond the sides of the receptacles.

45. In a machine for packing matches, the combination of a match supply hopper having a discharge opening, through which matches are fed in parallelism to subjacent receptacles and transversely thereof, means for feeding match receptacles in a path under and past said opening, a relatively thin vertically disposed plate overhanging such path at a point beyond the opening and the lower horizontal edge of said plate extending at right angles to the length of the matches within the receptacles, a loosely-supported member adjacent to and parallel with said edge, having capacity for limited vertical movement below said edge, and means for effecting a relative vertical movement between a receptacle and the plate at such point, whereby the movable member is caused to bear upon the contents of the receptacle longitudinally thereof.

46. In a machine for packing matches, the combination of a match supply hopper having a discharge opening, through which matches are fed in parallelism to subjacent receptacles and transversely thereof, means for feeding match receptacles in a path under and past said opening, diverging plates overhanging such path at a point beyond the opening, a relatively thin vertical plate between said diverging plates, and means for effecting a relative vertical movement between a receptacle and the overlying plates, whereby the said diverging plates are caused to embrace the upper lateral edges of the receptacles and cam or press back any matches projecting at their ends beyond the sides of the receptacles, and the said vertical plate is caused to bear upon and transversely of the contained matches.

47. In a machine for packing matches, the combination with a tray conveyer, of a tray-expanding member overhanging the path of the trays on the conveyer, and means for effecting a relative vertical movement between the trays and the said member, whereby the latter is caused to enter into the trays medially thereof and expand the ends of the trays.

48. In a machine for packing matches, the combination with a tray-conveyer, of a tray-expanding member overhanging the path of the trays on the conveyer, and means for raising the trays into engagement with the expanding member, said means including braces or supports for the ends of the trays.

49. In a machine for packing matches, the combination with a tray-conveyer, means for expanding the ends of the trays thereon, and means for supplying said trays with matches, of means for applying protection strips to the filled trays.

50. In a machine for packing matches, the combination with a tray-conveyer, means for expanding the ends of the trays thereon, and means for supplying said trays with matches, of means for applying protection strips to the filled trays, the last-named means including a plunger movable toward and from the conveyer provided with spaced strip supporting and inserting jaws.

51. In a machine for packing matches, the combination with a support for filled box-trays, of means for forming protection strips with downwardly bent ends and applying them directly to the filled trays with the said ends interposed between the matches and the adjacent ends of the trays.

52. In a machine for packing matches, the combination with a support for filled trays, of a blank supporting member movable over and away from said trays, means for bending down the ends of the blank to produce a protection strip when the said member is over a tray, and for applying the strip to the tray when the said member is moved therefrom.

53. In a machine for packing matches, the combination of a support for filled box-trays, of means for applying protection strips to the trays, said means including a plunger movable toward and from the support provided with spaced strip supporting and inserting jaws, and means for actuating said plunger.

54. In a machine for packing matches, the combination with a support for filled trays, of means movable relatively to the trays for applying protection strips to the filled trays, and a strip retainer for preventing retraction of the strip when the said applying means is withdrawn from the tray.

55. In a machine for packing matches, the combination with a support for box-trays, of means for applying protection strips to the trays, said means including a plunger movable toward and from the support provided with spaced strip inserting jaws, means for actuating said plunger, a strip presser between the said jaws, and connections whereby the presser is movable relatively to the plunger.

56. In a machine for packing matches, the combination with a support for box trays, of a plunger movable toward and from the support provided with spaced strip bending and inserting jaws, means for actuating said plunger, a blank supporting member movable into and from a plane between the plunger and the support, and means for actuating the said member with respect to the travel of the plunger.

57. In a machine for packing matches, the combination with a support for box trays, of a plunger movable toward and from the same provided with spaced strip bending and inserting jaws, means for actuating said plunger, a blank supporting member movable in a plane between the plunger and the support, means for actuating the said member with respect to the travel of the plunger, a presser between the said jaws, and connections whereby said presser is movably relatively to the plunger.

58. In a machine for packing matches, the combination with a support for box trays, of a plunger movable toward and from the same provided with spaced strip bending and inserting jaws, means for actuating said plunger, a blank supporting member movable in a plane between the plunger and the support, means for supplying blank strips successively to the said member, and means for actuating the said member with respect to the travel of the plunger.

59. In a machine for packing matches, the combination with a support for box trays, of a magazine for protection-strip blanks, a slide reciprocable beneath said magazine to receive and feed the blanks individually therefrom; cam devices, a connection between said slide and cam devices, a plunger adjacent the magazine provided with strip bending and inserting jaws, a connection between said plunger and cam devices, a presser between the jaws, and a sliding connection between said presser and plunger.

60. In a machine for packing matches, the combination with a tray conveyer and means for intermittently moving the same, of a plunger reciprocable toward and from the conveyer provided with spaced jaws for supporting the ends of protection strips and inserting them into the trays, and means for actuating said plunger.

61. In a machine for packing matches, the combination with means for supporting box shucks, a conveyer comprising links having box tray receiving portions, and means for advancing said conveyer to move the trays progressively opposite to the shuck-supporting means, of a head reciprocative across said links for ejecting the trays successively therefrom and entering them into the opposing shucks an arm supporting said head, a forwardly-projecting blade carried by said head, means for longitudinally reciprocating said arm, and a supporting member for said arm, said arm having a cam projection for periodical engagement with said member during the longitudinal reciprocation of the arm, whereby the blade is caused to bear upon the contents of each of the box trays throughout the length thereof during the endwise ejection of the tray from the conveyer.

Signed at Barberton in the county of Summit and State of Ohio this 17th day of Mar. A. D. 1909.

CHARLES H. PALMER.
MICHAEL PARIDON.

Witnesses:
F. M. ROOT,
D. J. KOONCE.